United States Patent [19]
Gaskins

[11] 3,977,571
[45] Aug. 31, 1976

[54] LIQUID APPLYING MEANS
[76] Inventor: Thomas Gaskins, Palmdale, Fla. 33944
[22] Filed: Aug. 7, 1975
[21] Appl. No.: 602,921

[52] U.S. Cl. ............................................... 222/180
[51] Int. Cl.² .......................................... B67D 5/06
[58] Field of Search ........... 222/185, 181, 143, 180; 47/57.5, 48.5; 111/96

[56] References Cited
UNITED STATES PATENTS
1,209,587   12/1916   Johanson ............................ 222/181
1,558,844   10/1925   Cronin ................................. 222/181
3,168,222    2/1965   Wanderer ........................ 222/143 X Primary Examiner—Allen N. Knowles
Assistant Examiner—Hadd Lane
Attorney, Agent, or Firm—Mason, Fenwick & Lawrence

[57] ABSTRACT

Conical treatment liquid containing vessels for applying preservative to wooden members supported by nail-like members driven into the wooden members and extending along the axis of the vessels and through a cover lid with the apex of the vessels discharging treatment liquid through a slot in the nail-like members; other embodiments employ flow openings in the wall of the conical vessels and a bulbous conical shape or horn shape vessel for additional liquid capacity; alternative support for the conical vessels is provided by a ring-like stand having vertical legs. An alternative vessel embodiment employs a split-ring shaped vessel of elastic material adapted to encircle a post or the like for dispensing fluid about the entire periphery of the post.

11 Claims, 8 Drawing Figures

U.S. Patent  Aug. 31, 1976  Sheet 1 of 2  3,977,571
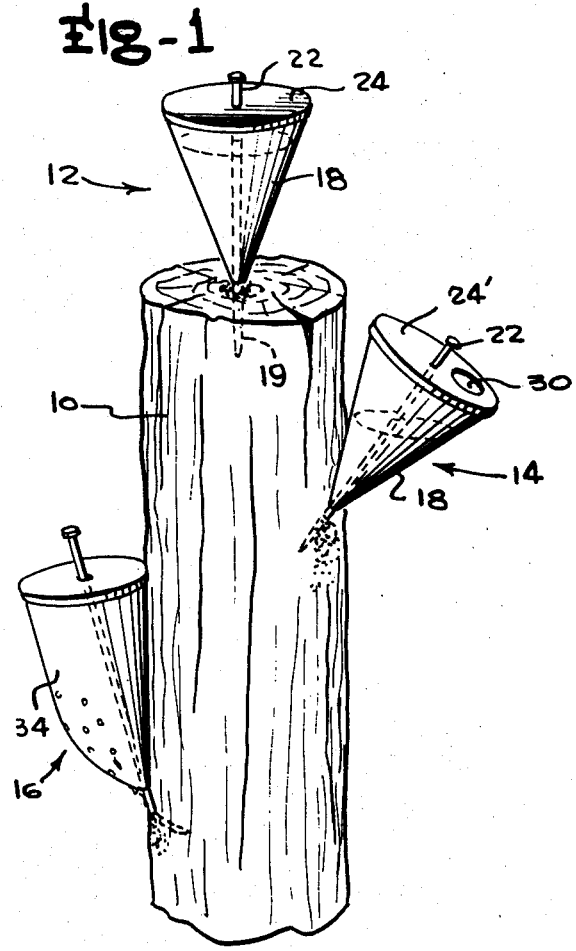
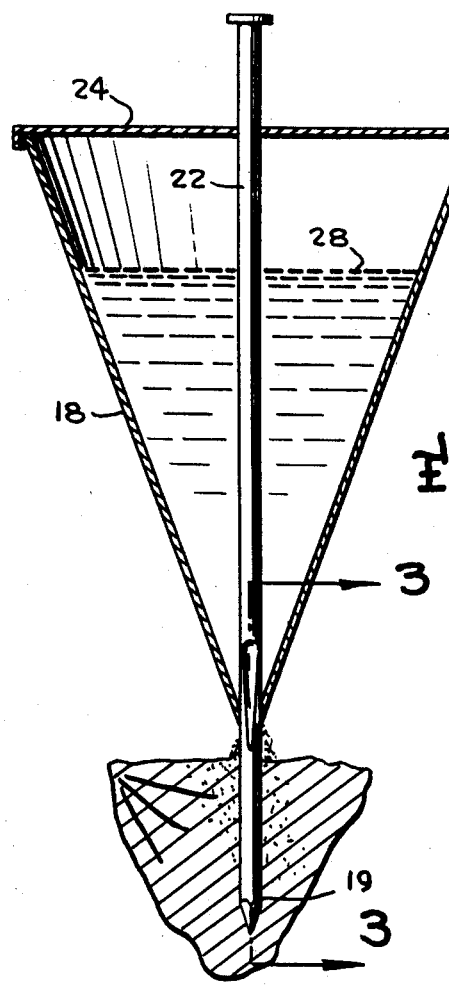
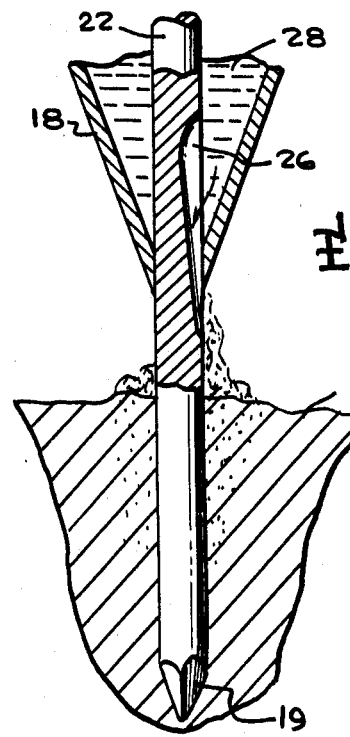
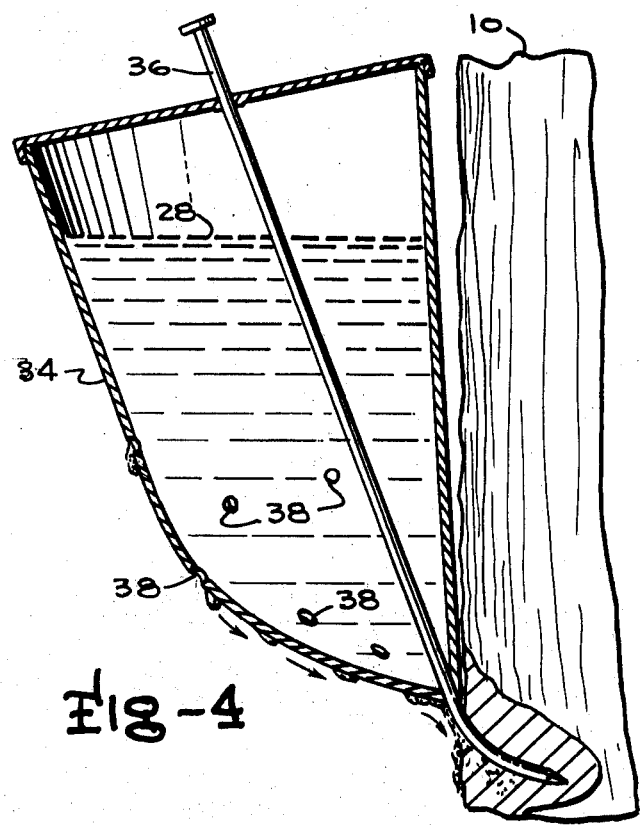

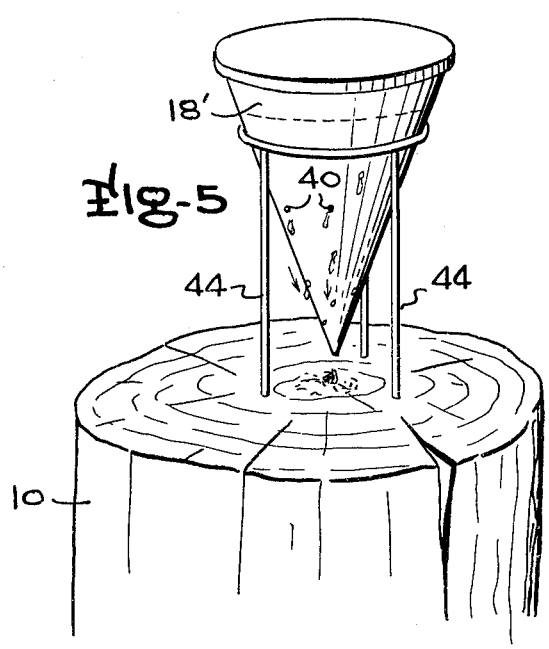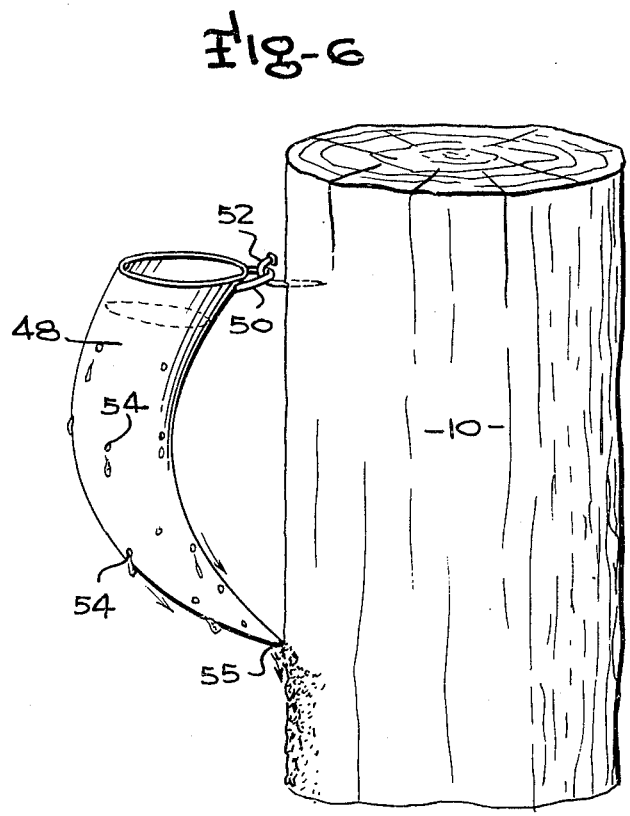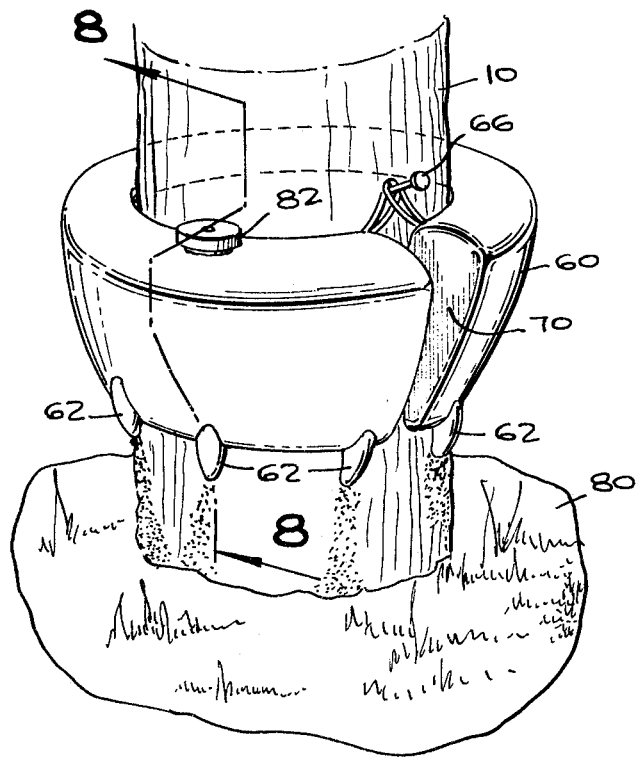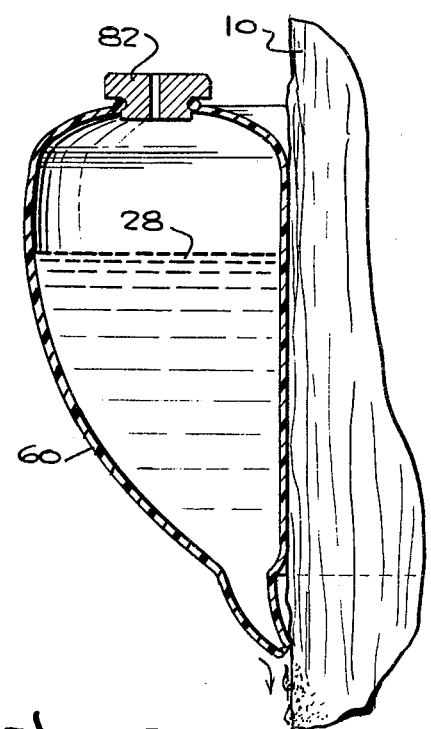

LIQUID APPLYING MEANS

This invention is in the field of liquid applying apparatus, and is particularly directed to the field of treatment type devices for supplying a measured continuous flow of treatment liquid to a desired area of means being treated. While the subject invention is susceptible of use in conjunction with a wide variety of applications such as the application of fertilizers, insecticides or the like to potted plants for similar uses, the primary usage of the invention is directed to the application of protective fluids such as creosote or the like to wooden members such as posts or other structural elements.

While the application of preservatives to posts and the like is easily accomplished with pressure equipment in a mill, the application of preservative liquid treatment material to wooden posts, structural members and the like in the field or forming part of a structure has previously entailed a great deal of difficulty and is frequently impossible. These difficulties are occasioned by the fact that a substantial amount of time is required for the treatment material to seep into the wood so that a continuous application of the material over a substantial period of time is necessary in order to provide effective treatment. Moreover, the application of treatment liquid to wooden members must be made at varying rates as the treatment process progresses since the initially dry members absorb a treatment liquid more rapidly than they do at later stages of the treatment process after they have absorbed a substantial amount of treatment liquid.

Therefore, it is the primary object of this invention to provide a new and improved means for supplying liquid treatment material.

Yet another object of the subject invention is the provision of new and improved means for supplying liquid preservative to wooden work members or the like continuously at a controlled rate over a substantial period of time.

Another object of the invention is the provision of new and improved means for applying preservative to wooden members in the field or forming part of a structure.

The foregoing and other objects of the invention are achieved by the preferred embodiments of the invention all of which consist of hollow container members which are matingly stackable for storage and individual ones of which are used by being mounted on supporting means so that treatment liquid in their interior is discharged through openings in their lower extent to be deposited by gravity on the work. In one embodiment, the hollow containers comprise conical vessels which are oriented with their axes extending generally upwardly and which are supported on nail-like members driven through the apex of the conical vessel into the body of material to be treated. In one version, the nail-like members are provided with an inwardly extending radial liquid feed slot with one end of the slot being on the interior of the conical vessel and an opposite end being external of the conical vessel so that liquid within the vessel flows outwardly through the slot onto the treatment area. The radial depth of the liquid feed slot varies along its length so that selected positioning of the container on the nail-like support member with respect to the slot can vary the amount of flow provided by the slot to provide a consequent variation in rate of discharge of the liquid material onto the treatment area. Alternatively, the liquid can be permitted to flow outwardly through a plurality of openings in the wall of the generally conical vessel to flow downwardly toward the apex of the vessel and thence onto the treatment surface.

In another embodiment, a ring-like stand is employed for supporting one of the conical members having the plural feed openings with the conical member being matingly inserted in a ring member downwardly from which a plurality of legs extend to rest upon the upper surface of the work being treated. Consequently, treatment material flowing from the conical vessel drops onto the work surface to effect the purpose of the invention.

Another variation of the subject invention resides in the employment of a horn-shaped hollow vessel having a plurality of outfeed flow openings in its wall through which the treatment liquid flows to move downwardly along the vessel for deposit on the work piece. In this case, the upper end of the horn-shaped vessel is supported by a nail or other support member and its lower end is urged into the side of the work member to provide the necessary contact for effecting transfer of the treatment liquid to the treated surface.

Another variation of the invention employs an encircling split-ring shaped vessel formed of flexible material which can be positioned about the periphery of a circular work piece such as the post or the like, and having end faces which define a slot which can be manually pulled apart and enlarged to permit the device to slip over the work piece. Loops of flexible cord or the like are positioned adjacent each of the end faces to be supported by a nail-like member driven into the work piece with the lower edges of the split-ring shaped vessel being provided with a plurality of outflow openings for dispensing the treatment material. Consequently, this use of the device enables the application of the treatment material about the entire periphery of a cylindrical post or the like in an obvious manner.

Yet another aspect of the invention resides in the employment of a conical vessel having a bulbous non-symmetrical shape for enabling the storage of a greater quantity of fluid than is the case with the purely conical vessel. In this case, the treatment liquid can be dispensed through flow openings in the wall of the vessel or through a flow control slot as previously discussed.

Generally speaking, all of the conical vessels and variations thereof employ a removable top or cover through which the nail-like support members extend. The nail-like support members extend in a general axial orientation in the purely conical vessel and the vessel is retained in position by engagement of the top or closure member with the nail and by the engagement of the apex of the vessel with the lower nail portion adjacent the work piece to which the treatment liquid is being applied.

The manner in which the disclosed embodiments of the invention achieves the purposes and foregoing objects will be better understood when the following detailed written description is considered in conjunction with the appended drawings in which:

FIG. 1 is a perspective view illustrating the employment of the conical vessel and bulbous conical vessel embodiments in the application of treatment fluid to a vertically extending post member;

FIG. 2 is a bisecting sectional view of the uppermost liquid applying means of FIG. 1;

FIG. 3 is a sectional view taken along lines 3–3 of FIG. 2;

FIG. 4 is a bisecting sectional view of the lowermost liquid applying means of FIG. 1;

FIG. 5 is a perspective view of another embodiment of the subject invention as employed on the upper end of a post member or the like;

FIG. 6 is a perspective view of yet another embodiment of the invention;

FIG. 7 is a perspective view of another embodiment of the invention; and

FIG. 8 is a sectional view taken along lines 8—8 of FIG. 7.

Attention is initially invited to FIGS. 1 through 4 of the drawings with first attention being directed to FIG. 1 which illustrates a vertically extending work piece consisting of a post member 10 having an uppermost liquid applying means 12, an intermediate liquid applying means 14 and a lowermost liquid applying means 16.

The uppermost liquid applying means 12 consists of a treatment liquid and dispensing member comprising a conical vessel 18 formed of thin-walled bio-degradable material having an opening in its lower extent 20 at its apex through which a support member consisting of a nail-like means 22 extends. Nail-like member 22 has its lower or pointed end 19 driven into the post 10 and has its upper end extending through an opening in a removable closure member 24 which serves to maintain the conical vessel 18 coaxially positioned with respect to member 22. A liquid dispensing slot 26 extends inwardly radially near one end of the nail-like member 22 as best illustrated in FIG. 3 so that liquid treatment material 28 on the interior of the container flows outwardly through slot 26 to engage the treated surface of the post member 10. The depth of slot 26 is variable along its length as is clearly illustrated in FIG. 3 so that the position of the conical vessel 18 can be adjusted along the length of the slot to vary the feed opening provided by the slot and consequently vary the rate of liquid discharge in an obvious manner.

The intermediate liquid applying means 14 is essentially identical to the upper liquid applying means 12 with the exception of the fact that it is provided with a removable closure or top member 24' having an access or refill opening 30 which permits refilling of the vessel 18 while the vessel remains in place on the post 10.

Lowermost liquid dispensing means 16 consists of a bulbous conical vessel 34 of non-symmetric configuration which bulges outwardly from the post member 10 so as to provide an increase in the liquid storage capacity as compared to the conical vessels 18. Bulbous conical vessel 34 is supported by a naillike member 36 driven into the side of the post as best illustrated in FIG. 4 with a plurality of liquid dispensing openings 38 being provided in the wall of the member 34 so that treatment liquid 28 on the interior of the vessel flows outwardly and then downwardly along the outer surface of the vessel to engage the treatment receiving area of the post 10 in an obvious manner. Alternatively, a slotted support member can be employed with the bulbous conical vessel 34 in the same manner as member 22 illustrated in FIG. 2. In any event, it will be noted that the effective number of flow openings through which the treatment liquid flows decreases as the level of the liquid falls in the vessel 34. Consequently, the rate of liquid discharge decreases with the lowering of the liquid level in the vessel. This is also true of the embodiments of FIGS. 1–3 in that the pressure of flow through the radial slot 26 decreases with the decrease in the rate of liquid above the slot 26. Consequently, the flow from the previously discussed embodiments decreases as the liquid level within the container vessels falls.

Attention is now invited to FIG. 5 which discloses another embodiment of the invention consisting of a conical vessel 18' provided with a plurality of flow openings 40 from which liquid flows downwardly along the upper surface of the vessel to drop onto the upper surface of a post member 10. Conical member 18' is essentially identical to the conical vessel 18 of the embodiment of FIG. 1 but employs flow openings 40 rather than relying upon the liquid discharged through a slot in a supporting member in the manner illustrated in FIG. 2. In the case of the embodiment of FIG. 5, the conical vessel 18 is supported by a stand consisting of a horizontal ring 42 from which a plurality of downwardly extending legs 44 extend.

Attention is now invited to FIG. 6 which illustrates another version of the invention in which the liquid storing and dispensing container which, like all of the preceeding embodiments, is stackable in mating manner for storage during periods of non-use. The embodiment of FIG. 6 consists of a horn-shaped vessel 48 supported at its upper end by a loop portion 50 extending over a bent nail or hook 52 and having a plurality of flow openings 54 through which the liquid is dispensed in the same manner as in the case of the embodiments of FIGS. 4 and 5. The center of gravity of the horn-shaped vessel 48 is such that its lower tip end 55 rests against the work piece of post 10 so that the liquid flowing outwardly through the opening 54 is deposited on the side of the area of the work piece being treated. Alternatively, the horn-shaped vessel 48 can be supported on a flat surface such as the top of a post by passing a vertically oriented nail-like member through the loop portion 50 and through the lower tip end 55 so as to maintain the horn-shaped vessel in vertical position.

FIG. 7 illustrates another embodiment of the invention of particular use in supplying treatment liquid about the periphery of a post 10 for soaking the post and surrounding soil 80 with treatment liquid. This embodiment consists of a hollow split-ring shaped vessel 60 on the lower edge of which downwardly extending teats 62 are provided. Members 62 are provided with a lowermost aperture from which treatment material 28 on the interior of the vessel flows so that the treatment material is supplied about the entire periphery of the post 10. Alternatively, teats 62 can be eliminated and their purpose served by a simple plurality of openings adjacent the post for discharging fluid thereon.

The vessel 60 is attached to the post by means of loop members 64 extending over a nail or other supporting member 66 as best illustrated in FIG. 7. It should be noted that the vessel 60 has end faces separated by a positioning slot 70 which can be enlarged by flexing of the vessel so as to enable positioning of the vessel on the supporting member 10 as shown in FIG. 7. The embodiments of FIGS. 7 and 8 is provided with an optional closure plug 82 in a refill opening which permits refilling of the device while in position on the supporting post 10. The device of this embodiment is of particular value in supplying a substantial quantity of treatment liquid to lowermost portions of a post or the like so that it can seep into the post as well as into the surrounding soil.

While only preferred embodiments of the invention have been discloses hereinabove, many modifications not departing from the inventive concepts will undoubtedly occur to those of skill in the art. For example, the nail-like members could be provided with screw type threads; the liquid holding containers could be in the form of plastic milk jugs or beer cans or inverted plastic bottles having a vertical nail-like member extending axially therein down through a screw cap resting on a flat surface to be treated with an opening for filling purposes being provided in what would normally be the bottom of the bottle. Devices of the last-mentioned type would dispense treatment liquid out through the thread space on the bottle neck past the cap with the amount dispensed depending upon the degree of tightening of the cap. Therefore, it should be understood that the spirit and scope of the invention is to be limited solely by the appended claims.

I claim:

1. Treating means for applying treatment liquid to wood work members such as posts or the like having areas desired to be treated, said treating means comprising container means for receiving and storing a quantity of treatment liquid, support means for said container means comprising a nail-like member having a pointed end which can be driven into the member to be treated for supporting said container means above the areas desired to be treated, and dispensing means for dispensing treatment liquid from said container means at a varying rate which is greatest when said container is full and which progressively decreases as the amount of treatment liquid in the container means decreases wherein said container comprises a hollow generally conical shaped vessel having an apex defining its lowermost extent and top closure means at its upper extent and wherein said nail-like member extends through an opening in the apex of said vessel and also extends through a centrally positioned opening in said top closure means.

2. The invention of claim 1 wherein said dispensing means includes a feed slot extending radially inward in said nail-like member, said feed slot having one end inside said vessel and an opposite end externally of said vessel adjacent said work member.

3. The invention of claim 1 wherein said dispensing means comprises a plurality of relatively small flow openings extending through the wall of said conical member.

4. The invention of claim 3 wherein said top closure means includes a refill opening for permitting the replacement of treatment liquid in said generally conical vessel while permitting said vessel to remain in place at a treatment site.

5. The invention of claim 1 wherein said top closure means includes a refill opening for permitting the replenishment of treatment liquid in said generally conical vessel while permitting said vessel to remain in place on the member being treated.

6. The invention of claim 1 wherein said container comprises a hollow generally conical shaped vessel having an apex defining its lower extent and top enclosure means at its upper extent and wherein said container is of non-symmetric conical shape including a bulbous lower portion bulging outwardly radially with respect to the axis of said vessel.

7. Treating means for applying treatment liquid to wood work members such as posts or the like having areas desired to be treated comprising container means for receiving and storing a quantity of treatment liquid comprising a hollow generally conical shaped vessel having an apex defining its lower extent and top enclosure means at its upper extent and wherein said container is of non-symmetric conical shape including a bulbous lower portion bulging outwardly radially with respect to the axis of said vessel, support means for said container means comprising a nail-like member having a pointed end which can be driven into the member to be treated for supporting said container means above the areas desired to be treated, and dispensing means for dispensing treatment liquid from said container means at a varying rate which is greatest when said container is full and which progressively decreases as the amount of treatment liquid in the container means decreases wherein said dispensing means comprises a plurality of small flow openings extending through the wall of said vessel.

8. Treating means for applying treatment liquid to wood work members such as posts or the like having areas desired to be treated comprising container means for receiving and storing a quantity of treatment liquid, support means for said container means comprising a nail-like impaling means having a pointed end which can be driven into the member to be treated for supporting said container means above the areas desired to be treated, and dispensing means for dispensing treatment liquid from said container means at a varying rate which is greatest when said container is full and which progressively decreases as the amount of treatment liquid in the container means decreases wherein said container means comprises a hollow horn-shaped vessel and dispensing means comprises a plurality of small flow openings extending through the wall of said horn-shaped vessel.

9. Treating means for applying treatment liquid to work members having areas desired to be treated comprising container means for receiving and storing a quantity of treatment liquid, support means for said container means for supporting said container means above the areas desired to be treated, and dispensing means for dispensing treatment liquid from said container means at a varying rate which is greatest when said container is full and which progressively decreases as the amount of treatment liquid in the container means decreases, wherein said container comprises a generally conical shaped hollow vessel, said support means comprises stand means consisting of a circular ring and downwardly extending leg members, said circular ring being of a diameter less than the maximum diameter of said generally conical shaped hollow vessel wherein said generally conical shaped hollow vessel can be matingly inserted in said ring to be supported thereby and wherein said dispensing means comprises a plurality of openings in said generally conical shaped hollow vessel which permits treatment liquid contained within said vessel to escape outwardly to be deposited by gravity on the work piece on which said stand means is mounted for support.

10. Treating means for applying treatment liquid to work members having areas desired to be treated comprising container means for receiving and storing a quantity of treatment liquid, support means for said container means for supporting said container means above the areas desired to be treated, and dispensing means for dispensing treatment liquid from said container means at a varying rate which is greatest when said container is full and which progressively decreases as the amount of treatment liquid in the container means decreases, wherein said container comprises a hollow ring-like vessel formed of flexible material, said hollow ring-like vessel having end faces defining a slot and said vessel being of sufficient flexibility to permit said vessel to be positioned around a cylindrical work piece in the form of a pole or the like by passing said slot over the work piece and additionally including loop means adjacent each of said end faces for engagement with said support means, said support means comprising a nail-like member driven in the work piece being treated and wherein said liquid dispensing means comprises a series of openings along the bottom portion of said hollow ringlike vessel.

11. The invention of claim 10 wherein said container is formed of plastic material.

* * * * *